US010970669B2

(12) United States Patent
Yund et al.

(10) Patent No.: US 10,970,669 B2
(45) Date of Patent: Apr. 6, 2021

(54) BLOCKCHAIN ENABLED TRANSACTION PROCESSING FOR AN INDUSTRIAL ASSET SUPPLY CHAIN

(71) Applicant: General Electric Company, Schenectady, NY (US)

(72) Inventors: Walter Charles Yund, Ballston Spa, NY (US); Patricia Denise Mackenzie, Clifton Park, NY (US); Joseph James Salvo, Schenectady, NY (US); John William Carbone, Niskayuna, NY (US); Benjamin Edward Beckmann, Niskayuna, NY (US); Dan Yang, Niskayuna, NY (US); Peter Koudal, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 324 days.

(21) Appl. No.: 16/010,809

(22) Filed: Jun. 18, 2018

(65) Prior Publication Data

US 2019/0385120 A1    Dec. 19, 2019

(51) Int. Cl.
*G06Q 10/08*    (2012.01)
*H04L 9/06*    (2006.01)
*G06F 16/27*    (2019.01)

(52) U.S. Cl.
CPC ......... *G06Q 10/0838* (2013.01); *G06F 16/27* (2019.01); *H04L 9/0637* (2013.01)

(58) Field of Classification Search
CPC ..... H04L 9/3239; H04L 9/0637; H04L 63/00; H04L 2209/38; G06F 16/27; G06Q 10/0838

(Continued)

(56) References Cited

U.S. PATENT DOCUMENTS

| 6,393,353 B1* | 5/2002 | Brocard | F01D 21/02 701/104 |
| 6,527,178 B1* | 3/2003 | Gordon | G07B 17/00435 235/375 |

(Continued)

FOREIGN PATENT DOCUMENTS

| CN | 106897068 A | 6/2017 |
| CN | 107451780 A | 12/2017 |

(Continued)

OTHER PUBLICATIONS

Saveen et al., "Blockchain ready manufacturing supply chain using distributed ledger", International Journal of Research in Engineering and Technology, pp. 1-10, 2016, 10 pp.

(Continued)

*Primary Examiner* — Andrew Joseph Rudy
(74) *Attorney, Agent, or Firm* — Fletcher Yoder, P.C.

(57) ABSTRACT

Some embodiments provide a system to facilitate transaction processing associated with an industrial asset supply chain having a first entity and a second entity. A first entity computer processor may retrieve, from a first entity database, information associated with pre-delivery data about the industrial asset. The first entity computer processor may then record pre-delivery data about the industrial asset via a secure, distributed transaction ledger. A second entity computer processor may retrieve, from a second entity database, information associated with a post-delivery event involving the industrial asset. The second entity computer processor may then record post-delivery event data about the industrial asset via a secure, distributed transaction ledger. The post-delivery event data might indicate, for example, that the industrial asset has been delivered, has been installed, is working properly, has been used, etc.

20 Claims, 15 Drawing Sheets

(58) Field of Classification Search
USPC .................................. 705/341; 235/377–385
See application file for complete search history.

(56) References Cited

U.S. PATENT DOCUMENTS

| | | | | |
|---|---|---|---|---|
| 7,225,981 | B2* | 6/2007 | Jongebloed | G06Q 10/087 |
| | | | | 235/385 |
| 7,369,635 | B2* | 5/2008 | Spital | A61N 1/37211 |
| | | | | 375/368 |
| 7,684,551 | B2* | 3/2010 | Salonen | G06Q 50/06 |
| | | | | 379/114.2 |
| 8,036,939 | B2* | 10/2011 | Gil | G06Q 10/08 |
| | | | | 705/17 |
| 8,051,150 | B2* | 11/2011 | Eubanks | G06Q 30/0633 |
| | | | | 709/220 |
| 8,126,581 | B2* | 2/2012 | Kostyk | G06Q 10/04 |
| | | | | 700/110 |
| 8,265,856 | B2* | 9/2012 | Hoard | F02D 41/405 |
| | | | | 701/103 |
| 8,849,685 | B2* | 9/2014 | Oden | G06Q 10/06311 |
| | | | | 705/7.11 |
| 9,239,989 | B2* | 1/2016 | Bouqata | G06N 20/00 |
| 9,357,021 | B2* | 5/2016 | Barker | H04N 21/2408 |
| 9,425,991 | B2* | 8/2016 | Du | G06Q 30/0242 |
| 9,533,096 | B2* | 1/2017 | Lebel | A61M 5/168 |
| 9,769,279 | B2* | 9/2017 | Burnette | H04L 67/26 |
| 9,858,421 | B2* | 1/2018 | Gillespie | G06F 21/575 |
| 9,860,228 | B2* | 1/2018 | Siegel | H04L 63/08 |
| 9,961,379 | B2* | 5/2018 | Flatt | G06Q 30/0251 |
| 9,967,334 | B2 | 5/2018 | Ford et al. | |
| 10,346,406 | B2* | 7/2019 | Booz | G06Q 20/0655 |
| 10,357,118 | B2* | 7/2019 | Swafford | A47F 5/0068 |
| 10,417,690 | B2* | 9/2019 | Mueller | G06Q 30/0635 |
| 10,586,261 | B2* | 3/2020 | Baig | G06Q 30/0635 |
| 2001/0034567 | A1* | 10/2001 | Allen | G06Q 10/10 |
| | | | | 700/283 |
| 2006/0143038 | A1* | 6/2006 | Sainsbury | G06Q 10/08 |
| | | | | 705/337 |
| 2015/0379510 | A1 | 12/2015 | Smith | |
| 2017/0279774 | A1 | 9/2017 | Booz et al. | |
| 2017/0287068 | A1 | 10/2017 | Nugent | |
| 2018/0253702 | A1* | 9/2018 | Dowding | G06Q 20/223 |

FOREIGN PATENT DOCUMENTS

| | | |
|---|---|---|
| CN | 107808288 A | 3/2018 |
| WO | 2017190175 A1 | 11/2017 |

OTHER PUBLICATIONS

Xu et al., "CoC: Secure Supply Chain Management System Based on Public Ledger", 2017 26th International Conference on Computer Communication and Networks (ICCCN), pp. 1-6, Vancouver, Canada, 2017, 6 pp.

* cited by examiner

| INDUSTRIAL ASSET IDENTIFIER 1102 | INDUSTRIAL ASSET DESCRIPTION 1104 | EVENT IDENTIFIER 1106 | EVENT TYPE 1108 | DATE/ TIME 1110 | CONTRACT RESULT 1112 | RECORDED IN BLOCKCHAIN? 1114 |
|---|---|---|---|---|---|---|
| IA_1001 | GAS TURBINE | E_1001_1 | DELIVERED | 7/15/2020 (12:30.35) | PAY SUPPLIERS | YES |
| IA_1001 | GAS TURBINE | E_1001_2 | WORKING | 7/15/2020 (15:45.02) | BEGIN WARRANTY | YES |
| IA_1002 | JET ENGINE | E_1002_1 | INSTALLED | 7/15/2020 (16:55.50) | PAY MANUFACTURER | YES |
| IA_1003 | AUTONOMOUS VEHICLE | E_1003_1 | USED | 7/15/2020 (22:12.25) | PAY PER-MILE | PENDING |

FIG. 11

BLOCKCHAIN ENABLED TRANSACTION PROCESSING FOR AN INDUSTRIAL ASSET SUPPLY CHAIN

BACKGROUND

Some embodiments disclosed herein relate to industrial assets and, more particularly, to blockchain enabled transaction processing for a supply chain.

One type of business process management system relates to organizing supplies used by a business entity (e.g., a corporation) for manufacturing and delivering goods and/or services. The organization and management of supplies is often referred to as a "supply chain." A supply chain comprises a system of organizations, people, activities, information, actors, resources, etc. (referred to herein as "entities") associated with the manufacture and delivery of a product or service from a supplier to a customer and/or user. Because a supply chain can encompass a complex set of resources from around the globe, a supply chain entity may have only a limited ability to transfer risks associated with the supply chain. An entity's failure to allocate risks and opportunities to drive cost reduction and revenue growth may have significant impact on an organization's ability to deliver a good or service and remain profitable.

In a global economy, a supply chain entity may face challenges relating to allocating material globally, such as figuring out where to place inventory so it is best located for upcoming demand. Similarly, an entity may experience defects in the supply chain which may not be immediately noticeable and may also be difficult to validate. To improve the exchange of information between various entities of a supply chain, a centralized system, managed by a trusted organization or consortium, might be implemented. These types of systems may require that critical business information either pass through or be stored at a location that is under the centralized system's control. In addition, a mechanism is required to establish user identity and this information is also commonly stored centrally. Because these types of systems are so centralized, they may be susceptible to multiple types of failures or attacks, such as concentrated and/or persistent cyber-attacks.

Due to the complexity of managing an extended supply chain of physical flows (e.g., parts, products, and processes), information flows (e.g., events and statuses), and/or contractual/financial flows (e.g. purchase order requests and contracts) with current technologies of disintegrated systems and paper-based processes, it may be difficult and costly to design a system to process supply chain transactions. Transactional tools might be implemented individually to implement manual processes, but such an approach may be impractical and inefficient. It would therefore be desirable to provide systems and methods to efficiently and securely manage transactions for supply chain entities.

SUMMARY

Some embodiments provide a system to facilitate transaction processing associated with an industrial asset supply chain having a first entity and a second entity. A first entity computer processor may retrieve, from a first entity database, information associated with pre-delivery data about the industrial asset. The first entity computer processor may then record pre-delivery data about the industrial asset via a secure, distributed transaction ledger. A second entity computer processor may retrieve, from a second entity database, information associated with a post-delivery event involving the industrial asset. The second entity computer processor may then record post-delivery event data about the industrial asset via a secure, distributed transaction ledger. The post-delivery event data might indicate, for example, that the industrial asset has been delivered, has been installed, is working properly, has been used, etc.

Some embodiments comprise: means for retrieving, by a first entity computer processor from a first entity database, electronic records including information associated with pre-delivery data about the industrial asset; means for recording, by the first entity computer processor, pre-delivery data about the industrial asset via a secure, distributed transaction ledger; means for retrieving, by a second entity computer processor from a second entity database, electronic records including information associated with a post-delivery event involving the industrial asset; and means for recording, by the second entity computer processor, post-delivery event data about the industrial asset via the secure, distributed transaction ledger.

Technical effects of some embodiments of the invention are improved ways to efficiently and securely manage transactions for supply chain entities. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 11 is a portion of a tabular industrial asset database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
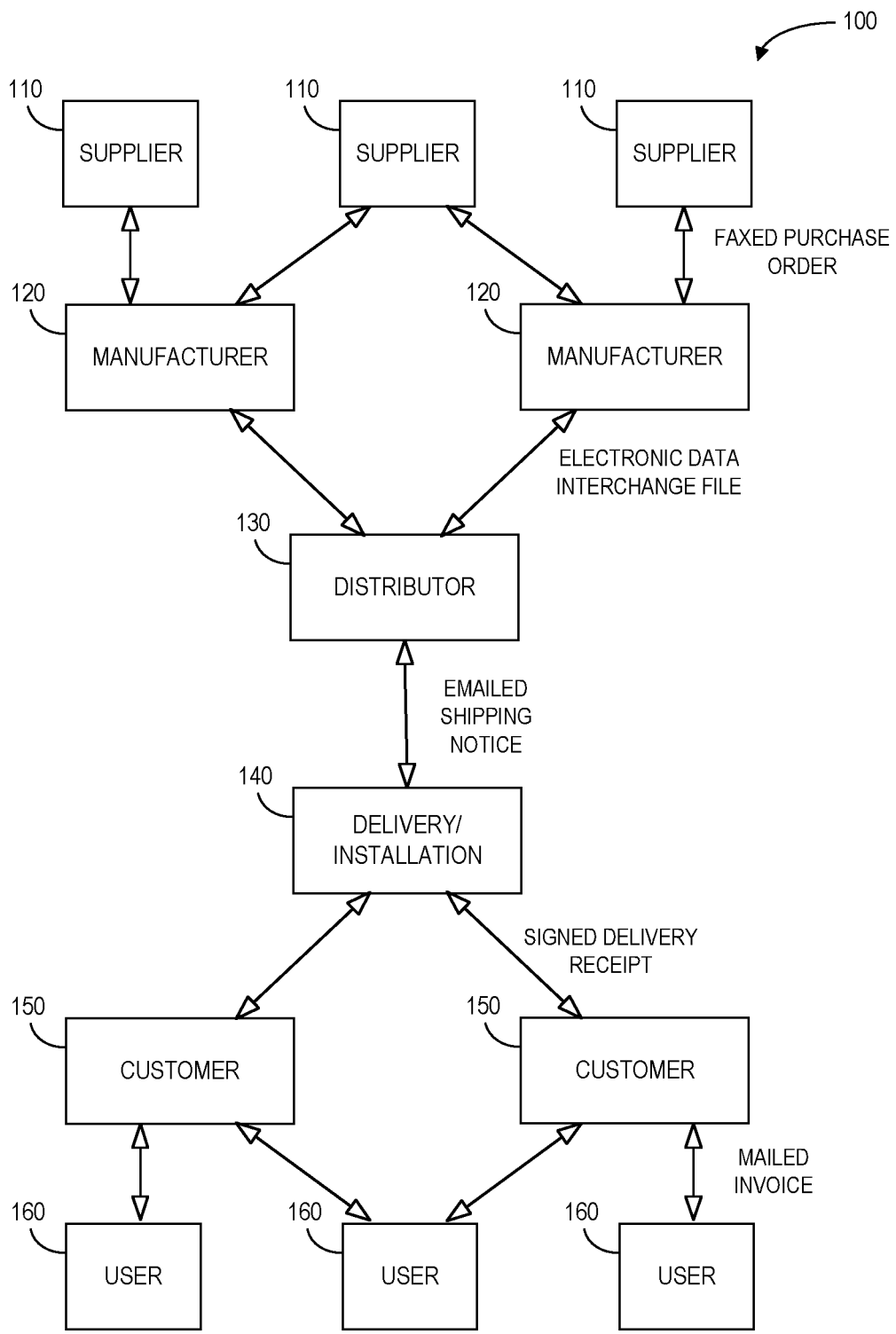
FIG. 1 is a high-level block diagram of a supply chain.

It may generally be desirable to efficiently and securely manage transactions for supply chain entities. As used herein, the phrase "supply chain" might be associated with, for example, a sequence of processes and/or entities involved in a production and/or distribution of a commodity (such as an industrial asset component or part). FIG. 1 is a high-level block diagram of a typical supply chain 100. The supply chain 100 includes suppliers 110 that may provide components or raw materials to a manufacturer 120 which might be tracked via purchase orders transmitted via facsimiles. The manufacturer 120 may fabricate an industrial asset and arrange for delivery/installation 140 via a distributor 130. These supply chain steps might involve exchanging Electronic Data Interchange ("EDI") files, emailed shipping notifications, signed delivery receipts, etc. Eventually, a customer 150 will receive the industrial asset (e.g., "in the field") and, in some cases, arrange for the asset to be used by a user 160 (e.g., a doctor might use an Magnetic Resonance Imaging ("MRI") machine and send an invoice to a patient via postal mail).

Because many different ways are used to exchange information in the supply chain 100, it can be difficult to process transactions in creative or more efficient ways. Note that current supplier-buyer relationships are characterized in part by the payment terms agreed upon between suppliers and customers. These payment terms are usually dependent upon the timing of the receipt of goods or services from the supplier, as defined by the supplier and buyer. These payment terms define the financial flow within a complex supply chain and may be dependent upon the information flow about the receipt of the good or service. The relative simplicity of these payment terms (dependent upon the receipt and terms of the contract) can create a misalignment of physical flow, information flow, and/or financial flow within a supply chain. For example, it may be that payment can only be remitted based upon the receipt of the good, not the point at which the good is used, e.g., the assembly point, the date of asset deployment, or the date of asset commissioning. Furthermore, no decentralized method for enabling buyer-supplier payments based upon the use of an asset in the field exists (nor does the ability to securitize these payments).

To reduce such problems, a supply chain system 200 includes a first entity platform 210 with a communication port to exchange information with a first entity database 212 (e.g., containing information about an industrial asset). Similarly, a second entity platform 250 may have a communication port to exchange information with a second entity database 252. The second entity database 252 might include, for example, electronic data records associated with industrial asset events 254, including an asset identifier 256, an event type 258, a date and time of the event, etc. By way of an example only, the first entity platform 210 might be associated with a supplier or manufacturer while the second entity platform 250 might be associated with a customer or user.

According to some embodiments, the first entity platform 210 records pre-delivery data in a secure, distributed transaction ledger 290. For example, the first entity platform 210 might record one or more of an order date and time, a price, an industrial asset item location, or the like via the secure, distributed transaction ledger 290 in accordance with any of the embodiments described herein. The second entity platform 250 records post-delivery events (e.g., in indication that an industrial asset has been installed or used) in the secure, distributed transaction ledger 290. The transaction ledger 290 might be associated with, for example, blockchain technology that can be verified via a remote operator or administrator device 270. According to some embodiments, the distributed transaction ledger might be associated with the HYPERLEDGER® blockchain verification system. Note that the platforms 210, 250 could be completely de-centralized and/or might be associated with a third party, such as a vendor that performs a service for an enterprise. According to some embodiments the first and second entity platforms 210, 250 may also exchange information with each other directly (as illustrated by the dotted arrow in FIG. 2).

The first entity platform 210 and/or second entity platform 250 might be, for example, associated with a Personal Computer ("PC"), laptop computer, a tablet computer, a smartphone, an enterprise server, a server farm, and/or a database or other storage devices. According to some embodiments, an "automated" first entity platform 210 may automatically record supply chain information in the transaction ledger 290 via a blockchain verification process. As used herein, the term "automated" may refer to, for example, actions that can be performed with little (or no) intervention by a human.

As used herein, devices, including those associated with the first entity platform 210 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 2:
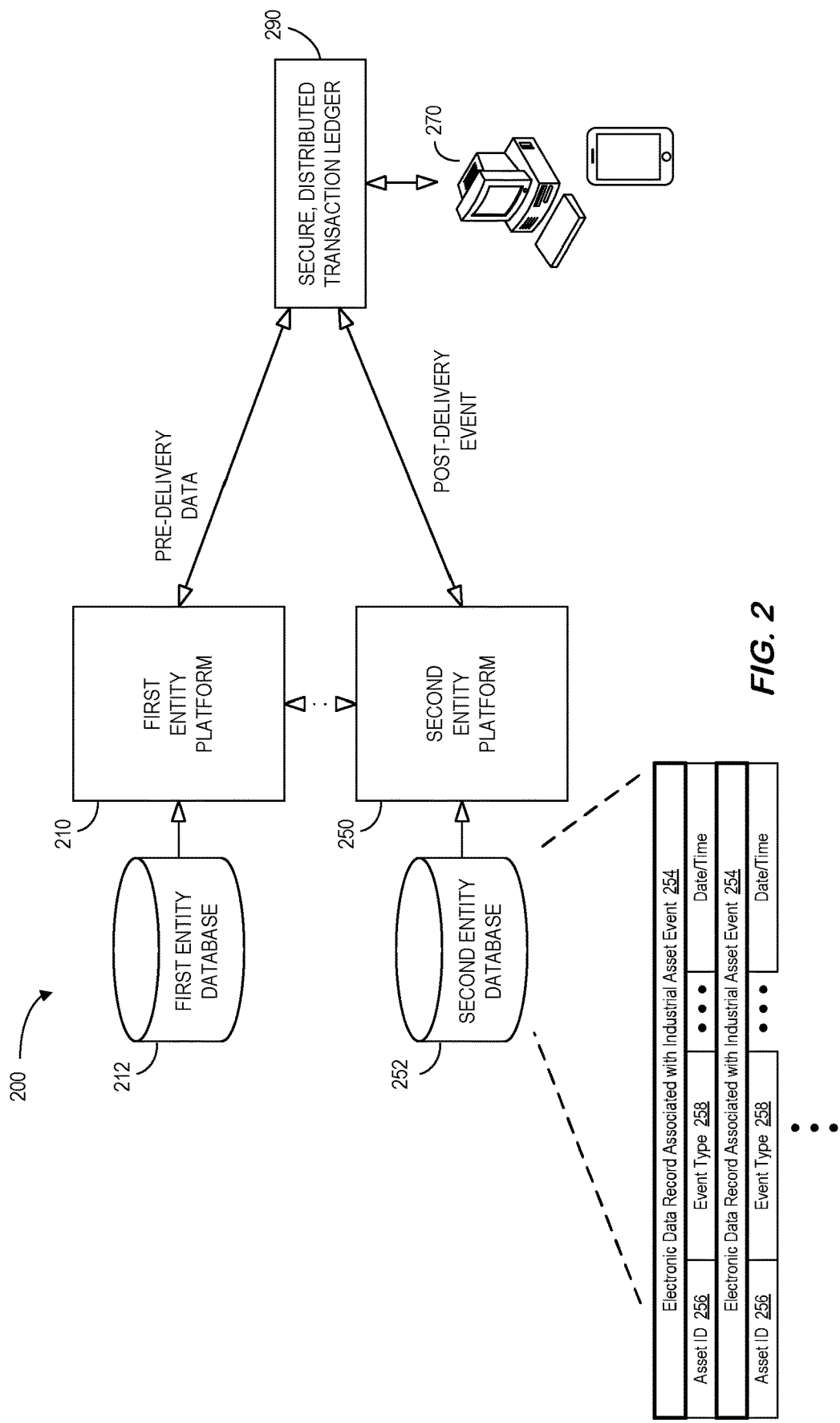
FIG. 2 is a high-level block diagram of a system according to some embodiments.

The platforms 210, 250 may store information into and/or retrieve information from data stores. The data stores might, for example, store electronic records representing prior transactions, transactions currently in process, digital events, etc. The data stores may be locally stored or reside remote from the platforms 210, 250. Although a single first entity platform 210 and second entity platform 250 are shown in FIG. 2, any number of such devices may be included. Moreover, various devices described herein might be combined according to embodiments of the present invention. For example, in some embodiments, the first entity platform 210, first entity database 212, and/or other devices might be co-located and/or may comprise a single apparatus.

Figure 3:
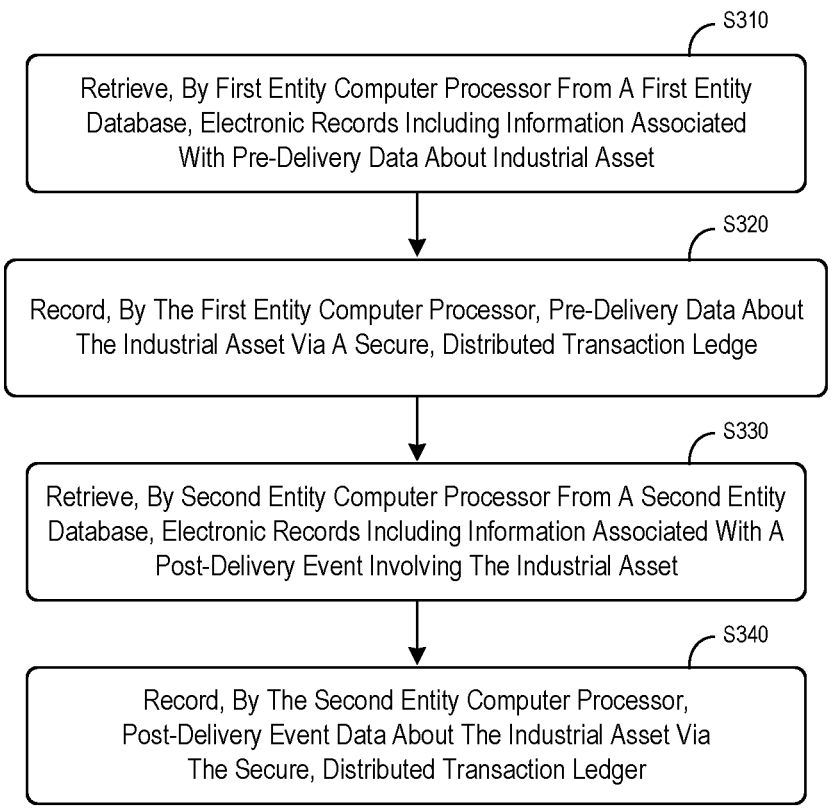
FIG. 3 is a method that may be associated with first and second supply chain entity platforms in accordance with some embodiments.

Note that the system 200 of FIG. 2 is provided only as an example, and embodiments may be associated with additional elements or components. According to some embodiments, the elements of the system 200 provide blockchain enabled supply chain transaction information processing. For example, FIG. 3 illustrates a method that might be performed by the system 200 described with respect to FIG. 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The method of FIG. 3 may be associated with an industrial asset, such as an engine, an aircraft, a locomotive, power generation, a wind turbine, a medical device, farming equipment, an autonomous vehicle, additive manufacturing, an unmanned aerial vehicle, etc. Moreover, the method is associated with a supply chain, such as a local supply chain, an international supply chain, a global supply chain, etc. At S310, a first entity computer processor may retrieve, from a first entity database, electronic records including information associated with pre-delivery data about the industrial asset. The first entity might be associated with, for example, a component supplier, a manufacturer of the industrial asset, a distributor, etc.

At S320, the first entity computer processor may record pre-delivery data about the industrial asset via a secure, distributed transaction ledger. According to some embodiments, the secure, distributed transaction ledger comprises blockchain technology that is controlled by a single, centralized entity or by multiple, distributed entities.

At S330, a second entity computer processor may retrieve, from a second entity database, electronic records including information associated with a post-delivery "event" involving the industrial asset. The second entity might be associated with, for example, a delivery entity, an installer entity, a customer, a user of the industrial asset, etc. As used herein, the term "event" may refer to any action or change in state associated with an industrial asset. Examples of events might include indications that the industrial asset has been delivered, the industrial asset has been installed, the industrial asset is working properly, the industrial asset has been used, etc.

At S340, the second entity computer processor may record post-delivery event data about the industrial asset via the secure, distributed transaction ledger. Note that the secure, distributed transaction ledger may store various types of information associated with an industrial asset, including quality information, delivery information, mission critical information, physical location data, product quality or quantity information, material quality information, inspection information, a price of a good, a price of a service, contractual commitment data, delivery conditions, shipping information, a blockchain enabled smart contract, etc.

In this way, the risks and costs associated with a supply chain may be allocated in various creative or more efficient ways. For example, a supplier might only be paid for a component after a completed industrial asset is installed and working for a customer. In general, some embodiments may allow for the creation of new payment structures using distributed transaction ledgers (e.g., blockchains), enabling verified payment remittances based on digitally-verifiable events (e.g., receipt, installation, assembly, commissioning, service rendering or usage) and securitization structures may be created from these payment remittances to dynamically change the financial structure of a supply chain consistent with physical transactions in the supply chain. Moreover, some embodiments may enable new contractual and financial relationships across an extended supply chain.

Figure 4:
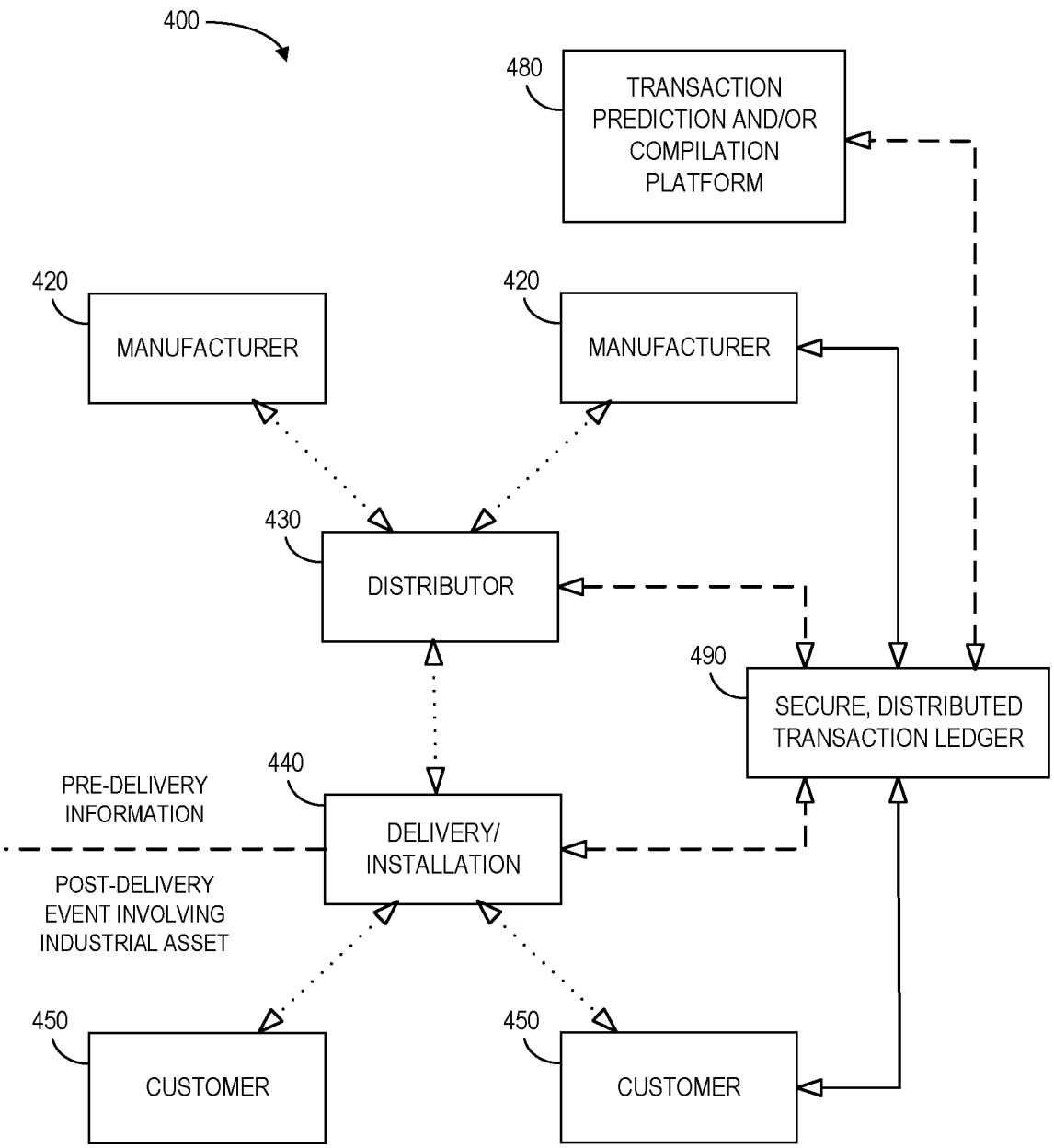
FIG. 4 illustrates elements of a supply chain in accordance with some embodiments.

For example, FIG. 4 illustrates a supply chain 400 according to some embodiments. The supply chain 400 includes a manufacture 420 of an industrial item (e.g., a gas turbine engine) that is provided to a customer 450 via a distributor 430 and/or a delivery/installation service 440. According to this embodiment, the supply chain 400 includes a pre-delivery portion (e.g., including a manufacturer 420 of the asset) and a post-delivery portion (e.g., including an ultimate customer 450). By recording information into a secure, distributed transaction ledger 490, the supply chain 400 can arrange to allocate risks and costs in various ways. For example, the manufacture 420 of a jet engine might not receive any payment (or a reduced payment) when an airplane is delivered to an airline but instead be paid on a per-mile basis as the airplane is flown. According to some embodiments, a transaction prediction and/or compilation platform 480 may be associated with the distributed transaction ledger 490 and/or other supply chain entities to facilitate such an arrangement (e.g., by tracking flown miles and transferring a payment to the jet engine manufacturer on a yearly basis). Note that the manufacturers 420, distributor 430, delivery/installation service 440, and/or customers 450 may also exchange information with each other directly (e.g., as illustrated by the dotted arrows in FIG. 4).

Figure 5:
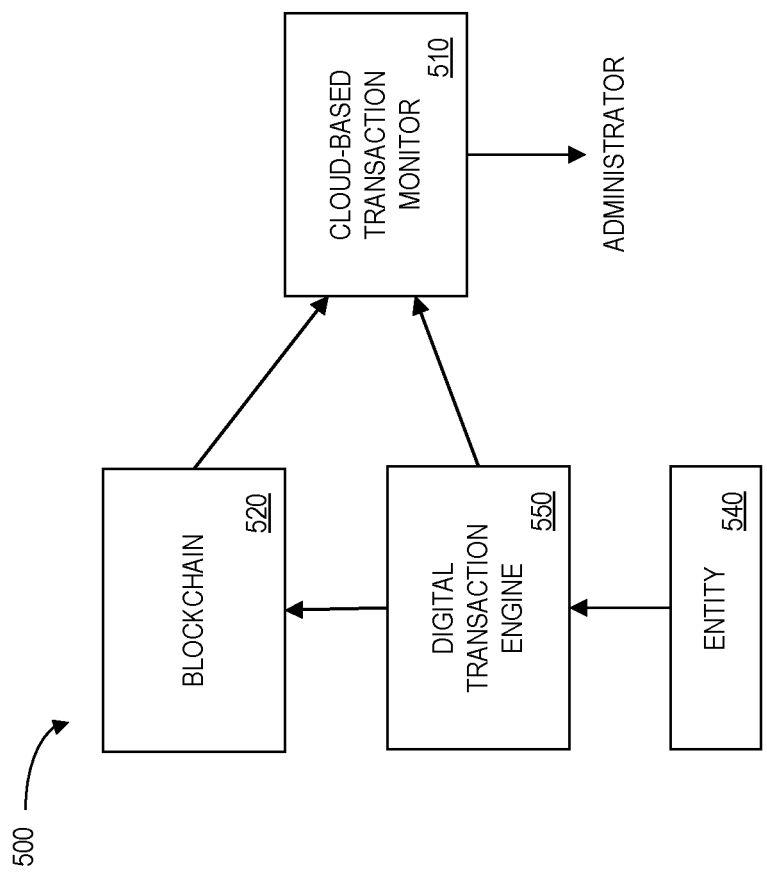
FIG. 5 is a system implementing blockchain enabled supply chain information sharing with blockchain validation according to some embodiments.
Figure 6:
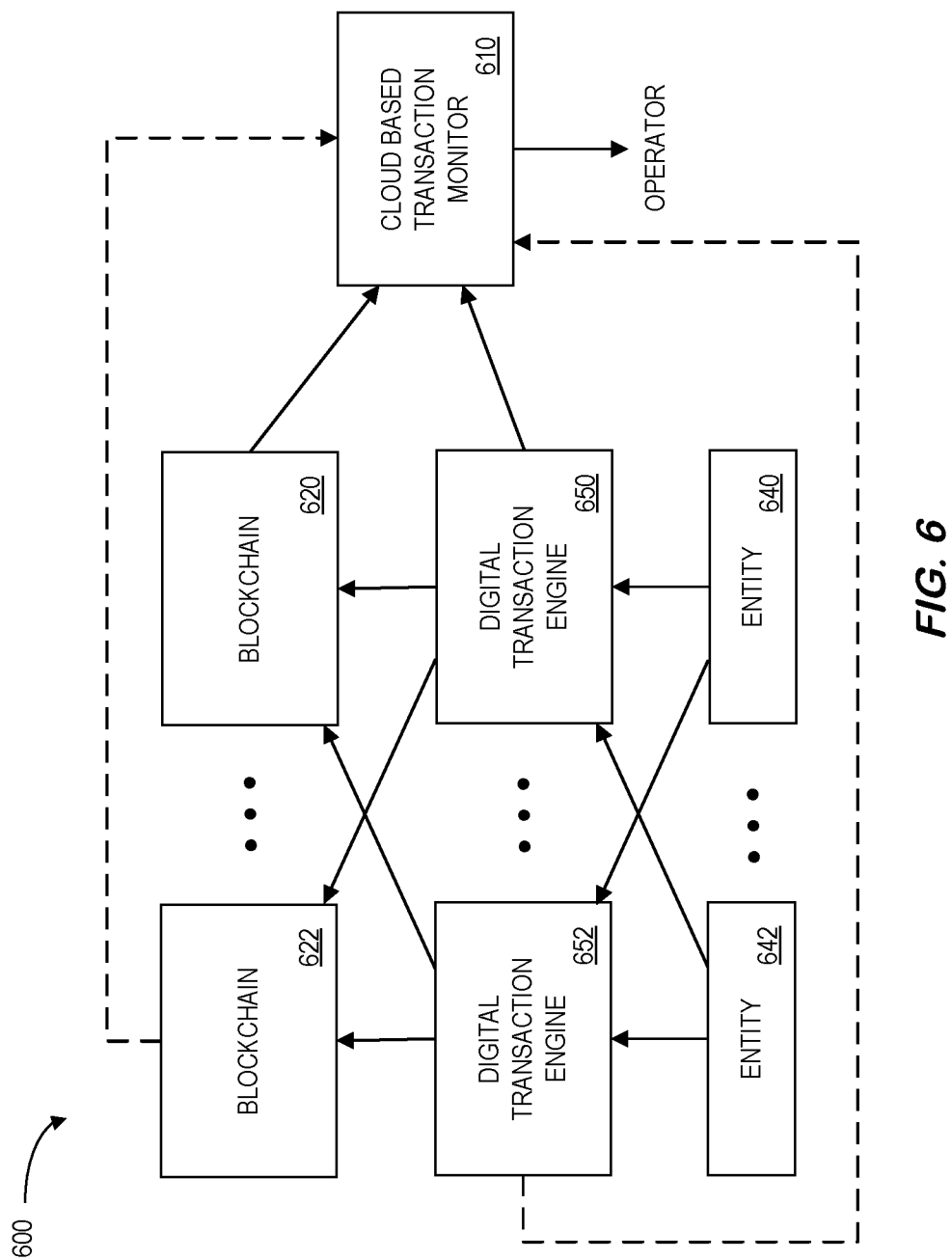
FIG. 6 is a system implementing blockchain enabled supply chain information sharing with multiple digital transaction engines in accordance with some embodiments.

FIG. 5 is a system 500 implementing supply chain information incorporating blockchain validation according to some embodiments. A cloud-based integrity monitor 510 may provide transaction integrity data via a web browser and exchange information with a blockchain 520 and a digital transaction engine 550 via Representational State Transfer ("REST") web services. The REST web services may, for example, provide interoperability between computer systems on the Internet (e.g., by allowing requesting systems to access and manipulate textual representations of web resources using a uniform, predefined set of stateless operations). According to some embodiments, portions of the digital transaction engine 550 may be associated with a MySQL or Oracle® database. In this way, the digital transaction engine 550 and blockchain 520 can be used to provide transaction level verification for a client 540 (e.g., a supply chain entity). Although FIG. 5 illustrates a system 500 with a single blockchain 520 and digital transaction engine 550, note that embodiments may employ other topologies. For example, FIG. 6 is a system 600 implementing supply chain information sharing incorporating multiple digital transaction engines in accordance with some embodiments. In particular, an additional blockchain 622 and digital transaction engine 652 may provide protection for an additional client 642. As illustrated in FIG. 6, each digital transaction engine 650, 652 may be associated with multiple blockchains 620, 622 providing additional protection for the system 600 (e.g., by storing information at multiple, geographically disperse nodes making cyber-attacks impractical). That is, each verifier (e.g., digital transaction engine) may commit a brief summary to an independent data store and, once recorded, the information cannot be changed without detection to provide a tamper-proof System of Records ("SoR").

Figure 7:
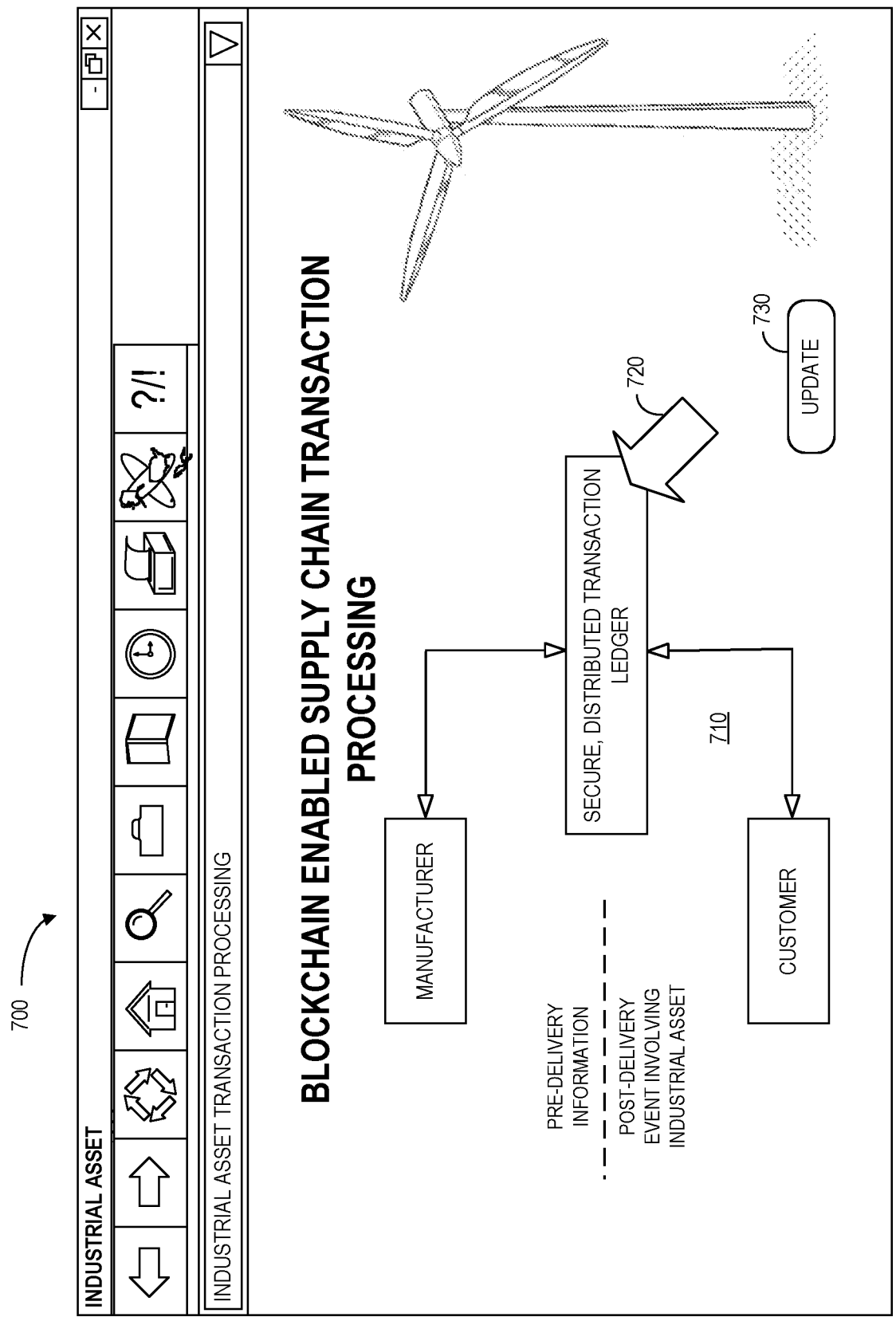
FIG. 7 is a blockchain enabled supply chain transaction processing display according to some embodiments.

FIG. 7 illustrates a computer display 700 in accordance with some embodiments. The display 700 includes a graphical representation 710 of a supply chain such that a user may select elements of the supply chain (e.g., via a computer mouse pointer 720 or touchscreen) to see further information and/or adjust details about that element (e.g., via a pop-up window). According to some embodiments, the display 700 includes one or more selectable icons 730 that can be used to update a supply chain, export or import data, save files, publish information, perform a blockchain validation, etc.

Thus, embodiments may provide blockchain enabled transaction information processing and sharing in a distributed supply chain. As illustrated by the supply chain 400 of FIG. 4, business partners across a globally distributed, multi-echelon supply chain may exchange information via a transaction ledger 490. Enabled by the secure, distributed transaction ledger, such as one associated with block-chain technology, embodiments described herein may enable companies to share business information across a trusted network.

Through a distributed blockchain network controlled by one, few, or many participants (e.g., an industry consortium), a collaborative system across a local or global supply chain may enable companies and individuals to participate in a flexible and trustworthy system. For example, a supplier of sensor components to an industrial customer might decide to assume all liability for future sensor failures. By participating in the network, both the supplier and customer may know that the information will be trustworthy. Moreover, the information might only be shared with the company and/or individual who need to know. Because the system can be configured to fit individual use cases, the need to sharing large chunks of data (when just a few data points are needed) may be reduced.

For information that is repetitive and/or needs to be updated and shared on a regular basis, the system may be configured and connected to specific locations (e.g., associated with databases, computers, etc.) at network participant sites. Validation information, such as location data, database information, computer information, etc., might be automatically accessed and entered into the information chain (and validated if needed by a trusted human owner/sender of the information). According to some embodiments, this information may be used to create a "digital fingerprint" to be added to the information, thus increasing a user's level of trust.

According to some embodiments, the blockchain enabled exchange of information between supply chain entities may be associated with a supplier Line Of Balance ("LOB") process. A LOB process may be associated with a repetitive process that exists within a contract's work scope and the manufacturing and assembly of parts in the factory. A LOB may comprise a management control process for collecting, measuring and presenting facts relating to time, cost and accomplishment which may all be measured against a specific plan.

In some embodiments, the blockchain enabled exchange of supply chain information may indicate that there is a high probability that each of the actors will timely deliver their respective goods or services. For example, an output of a LOB process might illustrate a status, a background, timing and phasing of project activities, and thus the LOB may provide management with measuring tools to (i) compare actual progress with an objective plan, (ii) examine any deviations from the objective plan (as well as gauging their degree of severity with respect to the remainder of the project), (iii) indicate areas where appropriate corrective action is required and/or (iv) forecast future performance. The blockchain enabled exchange of supply chain information may also be associated with extra costs that will occur when an actor is not timely and potentially misses a delivery date. The blockchain enabled exchange of supply chain information may be associated with constraints such as if a supplier can't build his goods, the supplier can't ship his goods and there may be financial repercussions associated with missing a delivery date. Unlike manual methods, the present embodiments may automatically facilitate (e.g., a technical effect) the optimization of supply chain functionality as various actors change component data and/or when there is a change in the various actors.

With dozens or hundreds of individual systems and smaller point solutions, companies would be left to manually handle critical business information with their hundreds or thousands of business partners. Enabled by block-chain technology, embodiments described herein may help companies share and retrieve business information across a trusted network allowing for creative ways to allocate costs, risks, etc. While focusing on the information sharing and processing, note that embodiments are not limited to any particular type of business data (e.g., the tracking of physical goods). Rather, embodiments may provide for the sharing of any supply chain information across the global networks—including quality information of products and materials, prices of goods and services, contractual commitments, delivery conditions, shipping information, etc.

Figure 8:
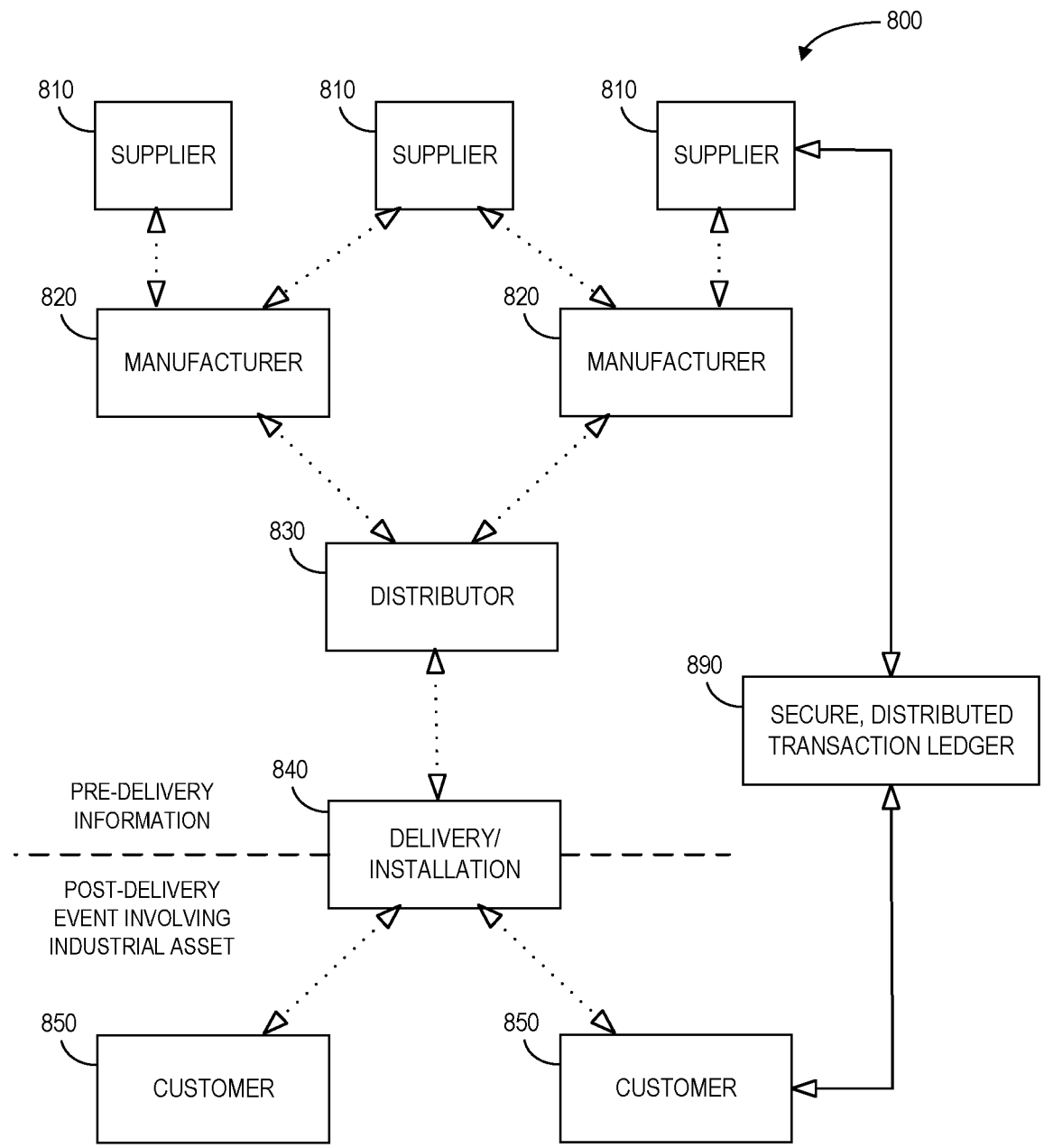
FIG. 8 is a more detailed view of a supply chain in accordance with some embodiments.

Note that the supply chain 400 provided in FIG. 4 is only one example, and embodiments may be associated with any other number of configurations. For example, FIG. 8 is a more detailed view of a supply chain 800 in accordance with some embodiments. As before, the supply chain 800 includes a manufacturer 820 of an industrial item (e.g., a farm tractor) that is provided to a customer 850 via a distributor 830 and/or a delivery/installation service 840. Moreover, suppliers 810 may provide components (e.g., engines, tires, blades, etc.) to the manufacturer 820. The supply chain 800 includes a pre-delivery portion (e.g., including a manufacturer 820 of the tractor) and a post-delivery portion (e.g., including the farmer or customer 850). By recording information into a secure, distributed transaction ledger 890, the supplier 810 and customers 850 can arrange to allocate risks and costs in various ways. For example, the supplier 810 of tractor blades might not receive payment until a farmer (customer 850) begins using a tractor with those blades. Note that the suppliers 810, manufacturers 820, distributor 830, delivery/installation service 840, and/or customers 850 may also exchange information with each other directly (e.g., as illustrated by the dotted arrows in FIG. 8).

Figure 9:
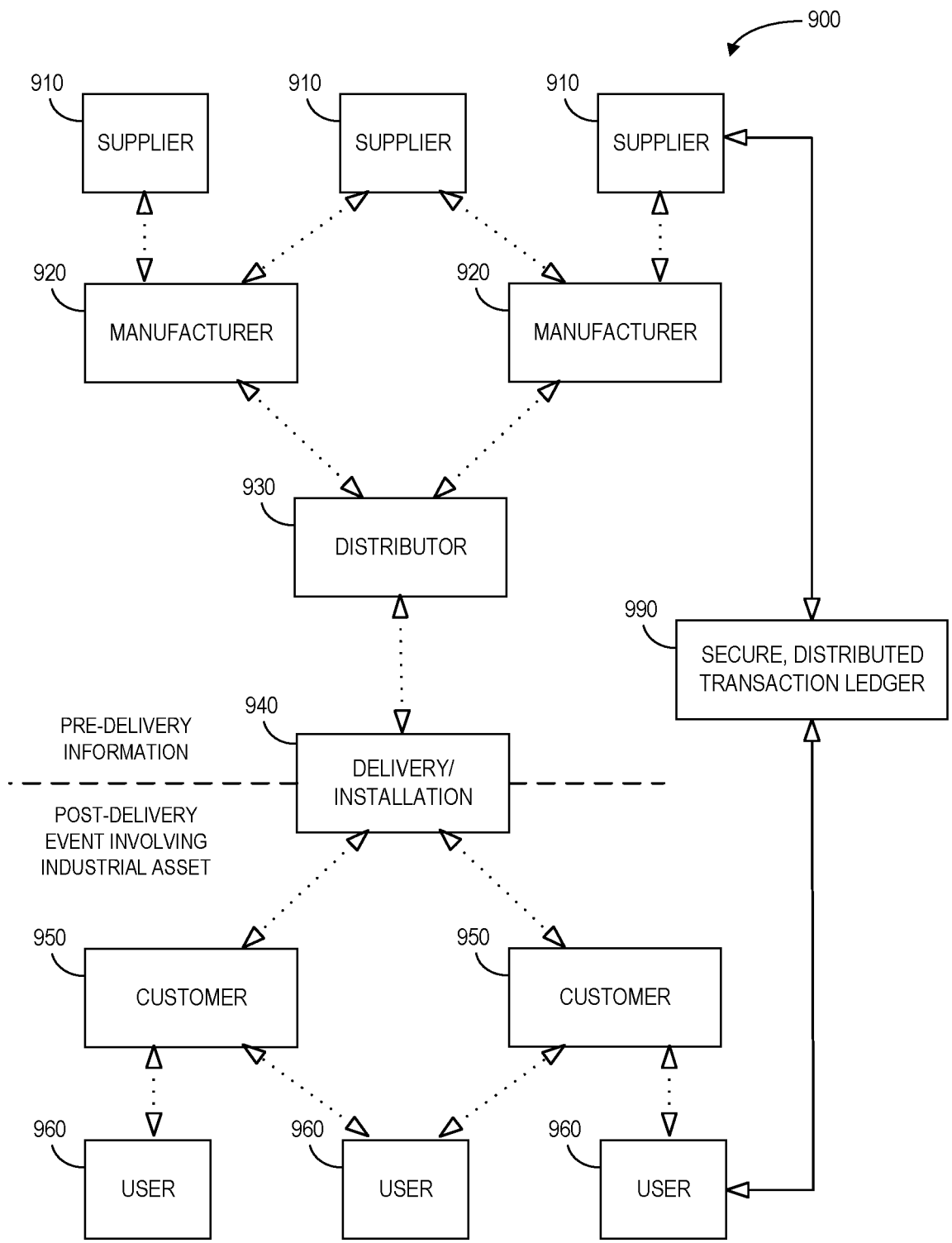
FIG. 9 is another detailed view of a supply chain in accordance with another embodiment.

FIG. 9 is another detailed view of a supply chain 900 in accordance with another embodiment. As before, the supply chain 900 includes a manufacture 920 of an industrial item (e.g., an X-ray machine) that is provided to a customer 950 via a distributor 930 and/or a delivery/installation service 940. Moreover, suppliers 910 may provide components to the manufacturer 920. The supply chain 900 includes a pre-delivery portion (e.g., including a manufacturer 920 and distributor 930 of the X-ray machine) and a post-delivery portion (e.g., including a hospital or customer 950 and users 960 such as doctors or patients). By recording information into a secure, distributed transaction ledger 990, the supplier 910 and customers 950 or users 960 can arrange to allocate risks and costs in various ways. For example, the supplier 910 of an X-ray machine component (e.g., a software application) might receive payments every time the X-ray machine is used, a patient is billed, etc. Note that the suppliers 910, manufacturers 920, distributor 930, delivery/installation service 940, customers 950, and/or users 960 may also exchange information with each other directly (e.g., as illustrated by the dotted arrows in FIG. 9).

Figure 10:
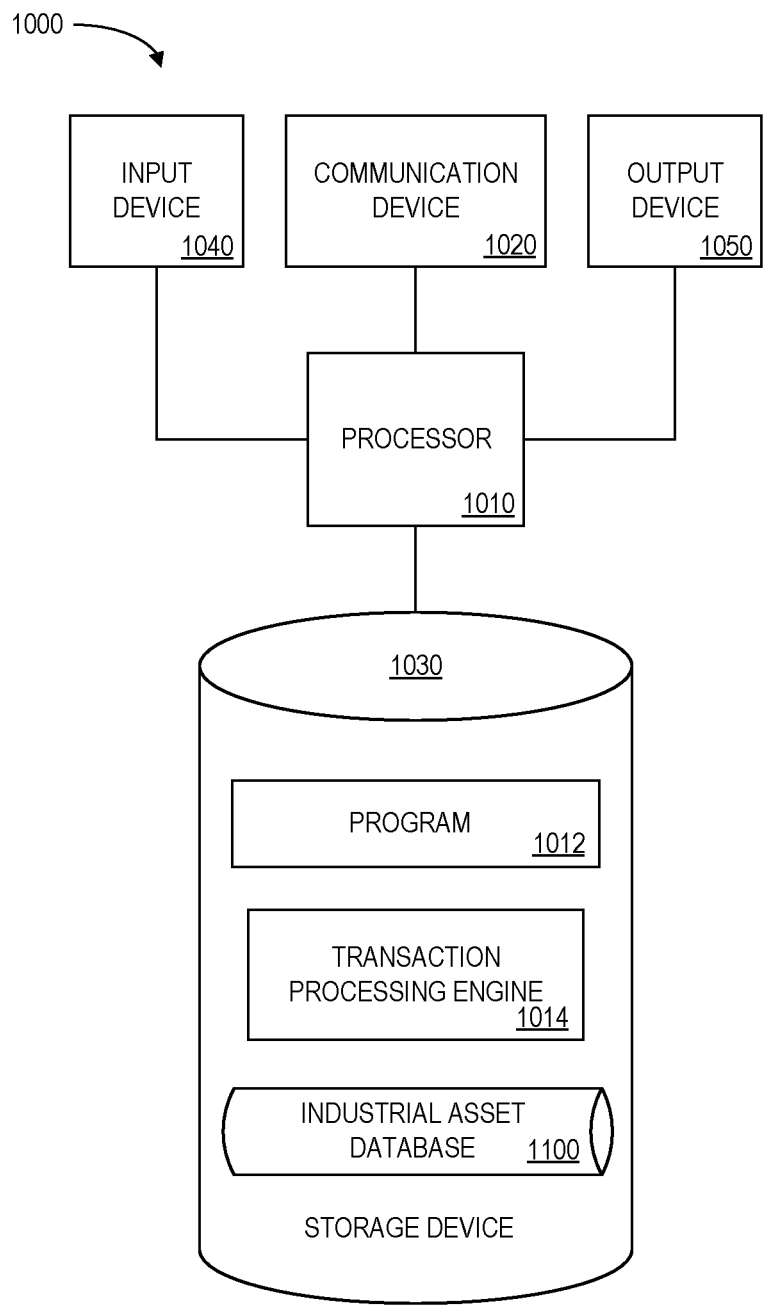
FIG. 10 illustrates a platform according to some embodiments.

Embodiments described herein may comprise a tool to help share information among supply chain entities and may be implemented using any number of different hardware configurations. For example, FIG. 10 illustrates a platform 1000 that may be, for example, associated with the supply chain entity platforms 210, 250 of FIG. 2 (as well as other systems described herein). The platform 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote platforms and/or a ledger. Note that communications exchanged via the communication device 1020 may utilize security features, such as those between a public internet user and an internal network of an insurance enterprise. The security features might be associated with, for example, web servers, firewalls, and/or Public Key Infrastructure ("PKI") devices. The platform 1000 further includes an input device 1040 (e.g., a mouse and/or keyboard to enter information about a distributed transaction ledger, a business relationship, etc.) and an output device 1050 (e.g., to output usage reports, arrange for a transfer funds, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and a transaction processing engine 1014 for controlling the processor 1010. The processor 1010 performs instructions of the program 1012, and thereby operates in accordance with any of the embodiments described herein. For example, the processor 1010 may provide a system to facilitate transaction processing associated with an industrial asset supply chain having a first entity and a second entity. The processor 1010 may retrieve, from a first entity database, information associated with pre-delivery data about the industrial asset. The processor 1010 may then record pre-delivery data about the industrial asset via a secure, distributed transaction ledger. When the platform 1000 is associated with another entity, the processor 1010 may retrieve, from a second entity database, information associated with a post-delivery event involving the industrial asset. The processor 1010 may then record post-delivery event data about the industrial asset via a secure, distributed transaction ledger. The post-delivery event data might indicate, for example, that the industrial asset has been delivered, has been installed, is working properly, has been used, etc.

The program 1012 may be stored in a compressed, compiled, uncompiled and/or encrypted format. The program 1012 may furthermore include other program elements, such as an operating system, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as shown in FIG. 10), the storage device 1030 further stores an industrial asset database 1100. An example of a database that might be used in connection with the platform 1000 will now be described in detail with respect to FIG. 11. Note that the database described herein is only an example, and additional and/or different information may be stored therein. Moreover, various databases might be split or combined in accordance with any of the embodiments described herein. For example, the industrial asset database 1100 might be combined with and/or linked to the program 1012.

Referring to FIG. 11, a table is shown that represents the industrial asset database 1100 that may be stored at the platform 1000 in accordance with some embodiments. The table may include, for example, entries identifying industrial assets distributed via a supply chain. The table may also define fields 1102, 1104, 1106, 1108, 1110, 1112, 1114 for each of the entries. The fields 1102, 1104, 1106, 1108, 1110, 1112, 1114 may, according to some embodiments, specify: an industrial asset identifier 1102, an industrial asset description 1104, an event identifier 1106, an event type 1108, a date and time 1110, a contract result 1112, and an indication of whether or not the event was recorded via a blockchain transaction ledger. The industrial asset database 1100 may be created and updated, for example, based on information electrically received from remote customer platforms, additive or subtractive manufacturer platforms, and/or distributed transaction ledger devices.

The industrial asset identifier 1102 may be, for example, a unique alphanumeric code identifying an asset distributed via a supply chain and the industrial asset description 1104 may describe the asset (e.g., as being a wind turbine, drone inspection, etc.). The event identifier 1006 may be a unique alphanumeric code identifying an event associated with the asset (e.g., a change in state or status), the event type 1108 might explain what the event means (e.g., an asset has been delivered or used), and the date and time 1110 might reflect when the event occurred. The contract result 1112 might indicate, for example, that funds need to be paid as a result of occurrence of the event. The recording in blockchain indication might indicate that the event was (or was not) recorded, that recordation is pending, etc.

Figure 12:
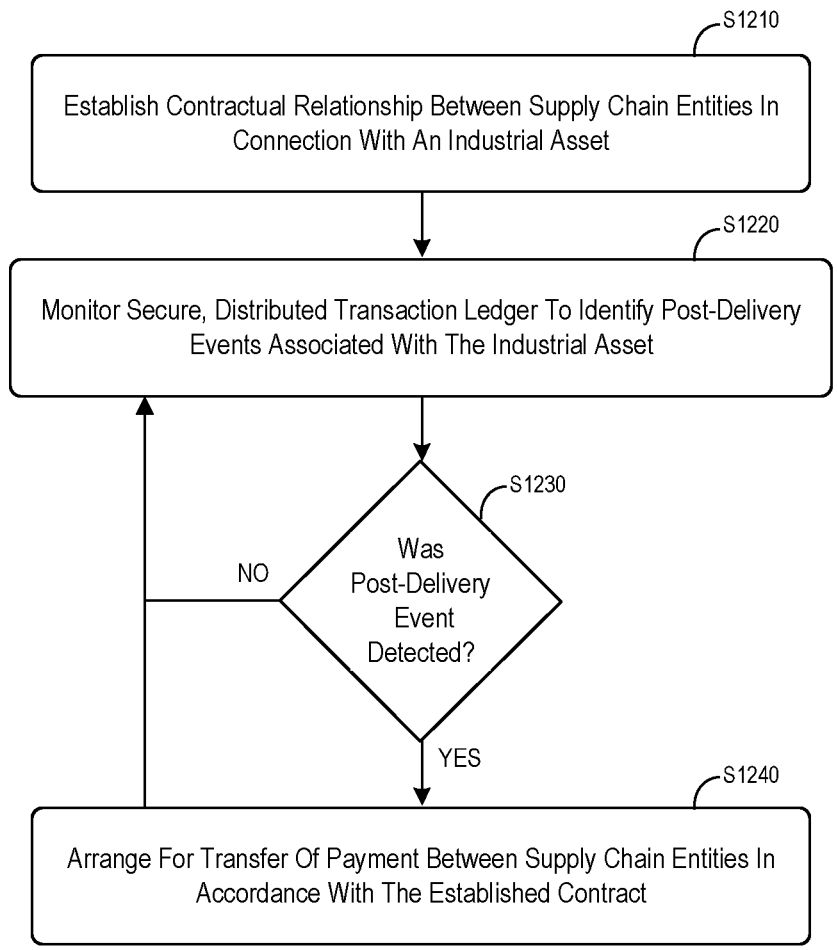
FIG. 12 is a method to incorporate blockchain enabled transaction processing into a contractual agreement according to some embodiments.

FIG. 12 is a method to incorporate blockchain enabled transaction processing into a contractual agreement according to some embodiments. Note that embodiments may provide supply chain participants (suppliers, original equipment manufacturers, service providers, customers, etc.) an ability to rapidly reconfigure financial and contractual arrangements of a supply chain and access new ways of financing the manufacture, delivery, and operation of equipment. Embodiments may leverage the decentralized validation of digitally-verifiable events using distributed transaction ledgers to change the contractual methods by which suppliers are remitted payment for goods or services provided to an Original Equipment Manufacturer ("OEM") or end customer. When properly configured, these contractual methods may help reduce or avoid the agency problems inherent in a supply chain that is limited by inflexible payment terms. The independent and decentralized validation of these digitally-verifiable events may enable many different contractual arrangements including:

blockchain-enabled verification of receipt of material (e.g., a widget arrived) triggering payment to suppliers by OEMs, investors, and/or other financing participants;

blockchain-enabled verification of material assembly point (e.g., a widget installed) triggering payment to supplier by an OEM, investors, and/or other financing participants;

blockchain-enabled verification of asset deployment (e.g., a widget-in-the-field) triggering payment to suppliers, OEMs, investors, and/or other financing participants;

blockchain-enabled verification of asset commissioning (e.g., a widget-working-in-the-field) triggering payments to suppliers, OEMs, investors, and/or other financing participants;

blockchain-enabled verification of asset usage triggering pay-on-use to supplier or OEM (e.g., a widget-being-used-in-the-field), in effect creating an event-based capital lease with event-based, time-based, and/or schedule-based payments to OEMs, suppliers, investors, and/or other financing participants;

blockchain-enabled factoring and securitization of payments, either based on pay-on-use from end customers or other upstream tollgates with automatic triggers based on component life limits or reliability issues tied to specific supplier issues and the blending of various types of payments into a market-available security;

blockchain-enabled pass-through value chain financing of assets and components;

an ability to dynamically share risk, margin, equity and insurance across multiple legal entities in a supply chain; and/or an ability to dynamically change contractual agreements with suppliers during the New Product Development ("NPD"), New Product Introduction ("NPI"), New Services Introduction ("NSI") phases of a product or service lifecycle, limiting cash flow consequences (e.g., stranded inventory and cash-to-cash inversion).

At S1210, a contractual relationship may be established between supply chain entities in connection with an industrial asset. For example, a manufacturer and customer might enter into an agreement. At S1220, the system may monitor a secure, distributed transaction ledger to identify post-delivery events associated with the industrial asset (e.g., that the asset was delivered, that the asset as installed, that the asset was used). At S1230, it is determined if such an event was detected. If a post-delivery event was not detected at S2130, the system may continue to monitor the ledger at S1220. If a post-delivery event was detected at S1230 (e.g., the event occurred and was recorded in the transaction ledger), the system may arrange for a transfer of funds between the supply chain entities in accordance with the established contract at S1240. The system may then continue to monitor the ledger at S1220 (e.g., to see if further events occur).

Figure 13:
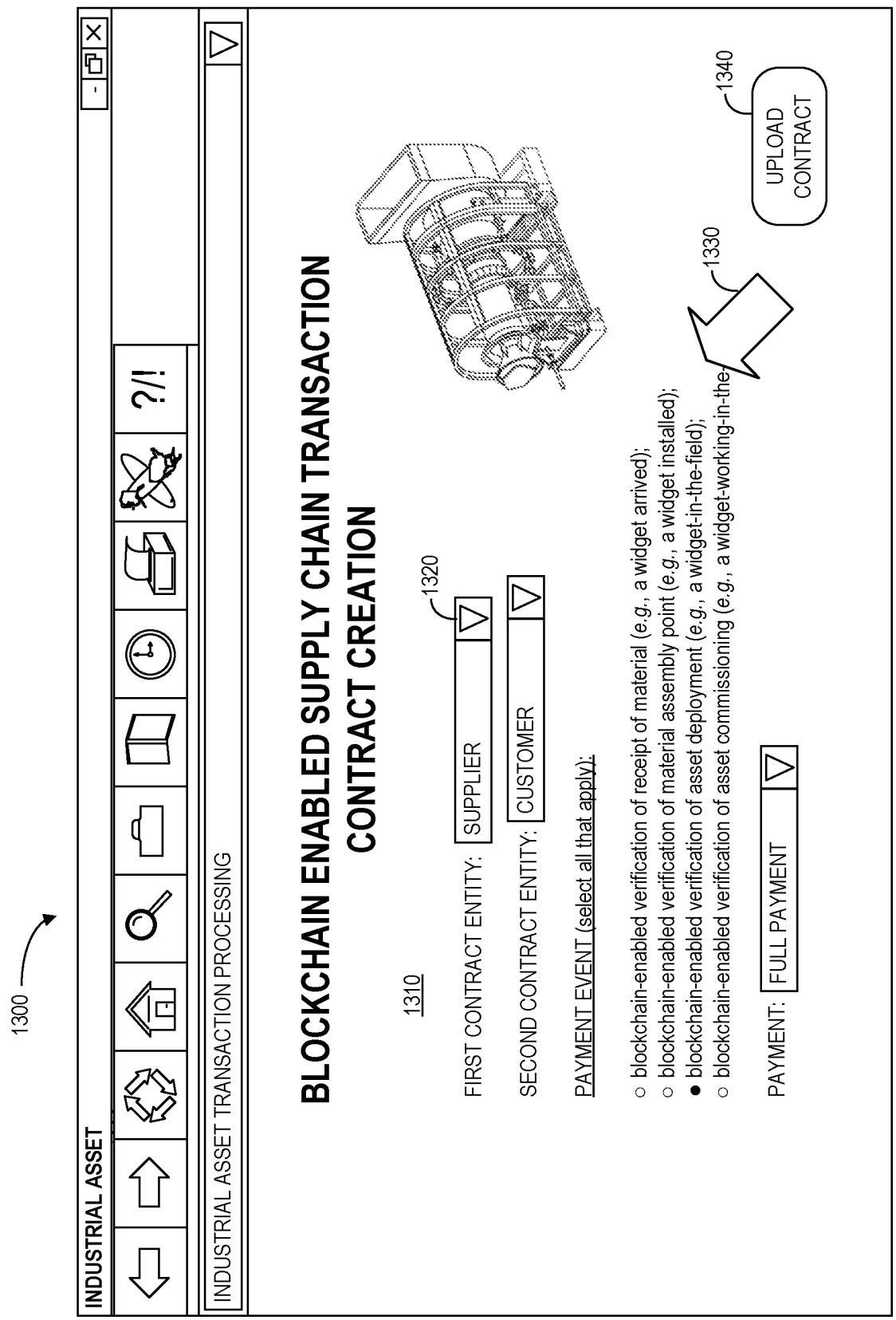
FIG. 13 is contractual agreement display in accordance with some embodiments.

FIG. 13 is contractual agreement display 1300 in accordance with some embodiments. The display 1300 includes a graphical representation 1310 of a supply chain contract definition interface. The interface may allow for the definition of parties (e.g., via drop-down menus 1320), contact terms regarding payment events (e.g., selectable via computer mouse pointer 1330), payment details, etc. The display 1300 may further include a user selectable icon 1340 that allows the contract details to be uploaded (e.g., to a secure, distributed transaction ledger) when competed.

Thus, embodiments may enable a decentralized verification and corresponding remittance to a supplier based upon the date of receipt of goods or services, the date of assembly, deployment, commissioning, and/or use. This decentralized verification and remittance may then be used to securitize the payment stream of pay-on-use contractual arrangements, enabling an alignment of the physical and information flow of material and services through a supply chain with the corresponding financial flow of that supply chain.

Figure 14:
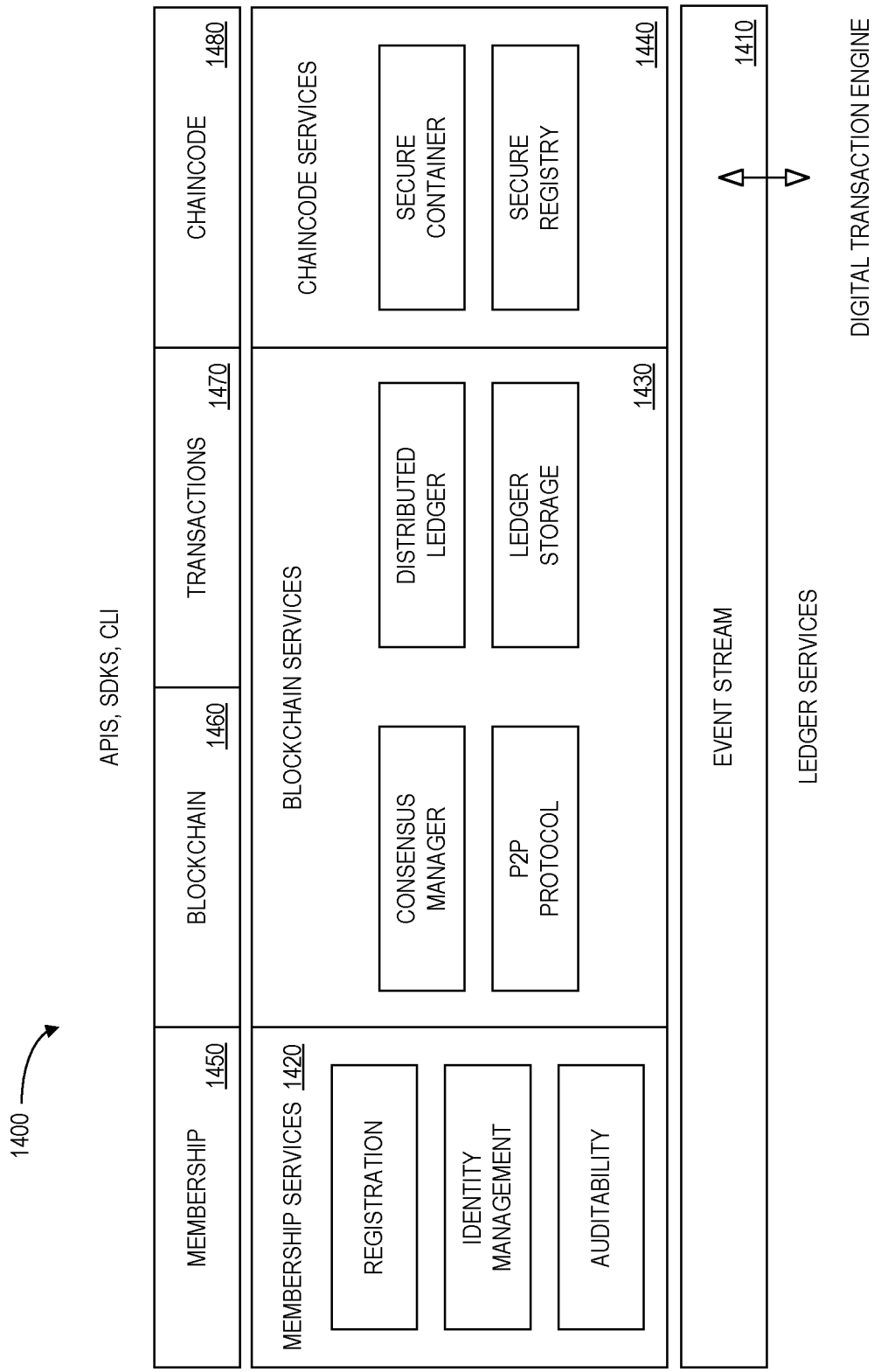
FIG. 14 is a distributed transaction ledger reference architecture according to some embodiments.

Embodiments may be associated with any type of distributed transaction ledger having a de-centralized consensus-based network that supports smart contracts, digital assets, record repositories, and/or cryptographic security. For example, FIG. 14 is a distributed transaction ledger reference architecture 1400 according to some embodiments. The architecture 1400 includes ledger services and an event stream 1410 that may contain network security service information (e.g., from a supply chain platform). Membership services 1420 (e.g., including registration, identity managements, and/or an auditability process) may manage identity, privacy, and confidentially for membership 1450 for the network security service. Blockchain services 1430 (e.g., including a consensus manager, Peer-to-Peer ("P2P") protocol, a distributed transaction ledger, and/or ledger storage) may manage the distributed transaction ledger through a P2P protocol built on HTTP to maintain a single state that is replicated at many nodes to support blockchains 1460 and transactions 1470. Chaincode services 1440 (e.g., secure container and/or a secure registry associated with a smart contract) may help compartmentalize smart contract (or chaincode 1480) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service via the reference architecture 1400.

Thus, some embodiments described herein may use blockchain technology to provide for an independent verification of material position and/or service disposition. Moreover, embodiments may create contractual agreements with payment remittance based upon more complex material/service states and provide a more accurate and consistent material flow through a supply chain. Some advantages of embodiments described herein include: an external funding of a supply chain; deferment of cash-to-cash cycle based on Accounts Receivable ("AR")/Accounts Payable ("AP") reversal; predictable flows of funds (limiting opportunity for fraud); limited NPI cash consequences (e.g., stranded inventory); a securitization and service plans; independent verification and validation of product performance tied to supplier quality; financial risk sharing across an extended supply chain; operational risk sharing across extended supply chain (e.g., resource allocation), etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Note that embodiments described herein might be associated with many different types of supply chains and/or business entities. For example, some embodiments may be associated with additive manufacturing in accordance with some embodiments. In such cases, information associated with at least a portion of a supply chain may be retrieved from an additive manufacturing platform database. According to some embodiments, the additive manufacturing platform utilizes an additive manufacturing printer associated with three-dimensional printing. In this case, the information about the supply chain might be associated with a printer model, a resolution, a powder, a deadline, material specifications, process conditions, etc. As used herein, the phrase "additive manufacturing" may refer to various types of three-dimensional printing, including, for example, those described in the American Society for Testing and Materials ("ASTM") group "ASTM F42—Additive Manufacturing" standards. These include vat photopolymerisation (using a vat of liquid photopolymer resin), material jetting (where material is jetted onto a build platform), binder jetting (e.g., using a powder based material and a binder), material extrusion such as Fuse Deposition Modelling ("FDM"), powder bed fusion (e.g., Direct Metal Laser Sintering ("DMLS"), Electron Beam Melting ("EBM"), etc.), a sheet lamination (including Ultrasonic Additive Manufacturing ("UAM") and Laminated Object Manufacturing ("LOM")), and Directed Energy Deposition ("DED"). Payment obligations may then be based on events associated with item printing, item use, etc.

Note that the processes described herein might be applicable in other supply chain environments. For example, the supply chain might be associated with automobile manufacturing, consumer electronics (e.g., smartphones, tablet computers, and the like), electric power generation, etc. As another example, a producer of intellectual property (e.g., Computer Aided Design ("CAD") files describing a product, movies, songs, television shows, etc.) might record post-deployments event information via a secure, distributed transaction ledger. A distributor of such intellectual property might then access the ledger to arrange for supply chain payments as appropriate.

Figure 15:
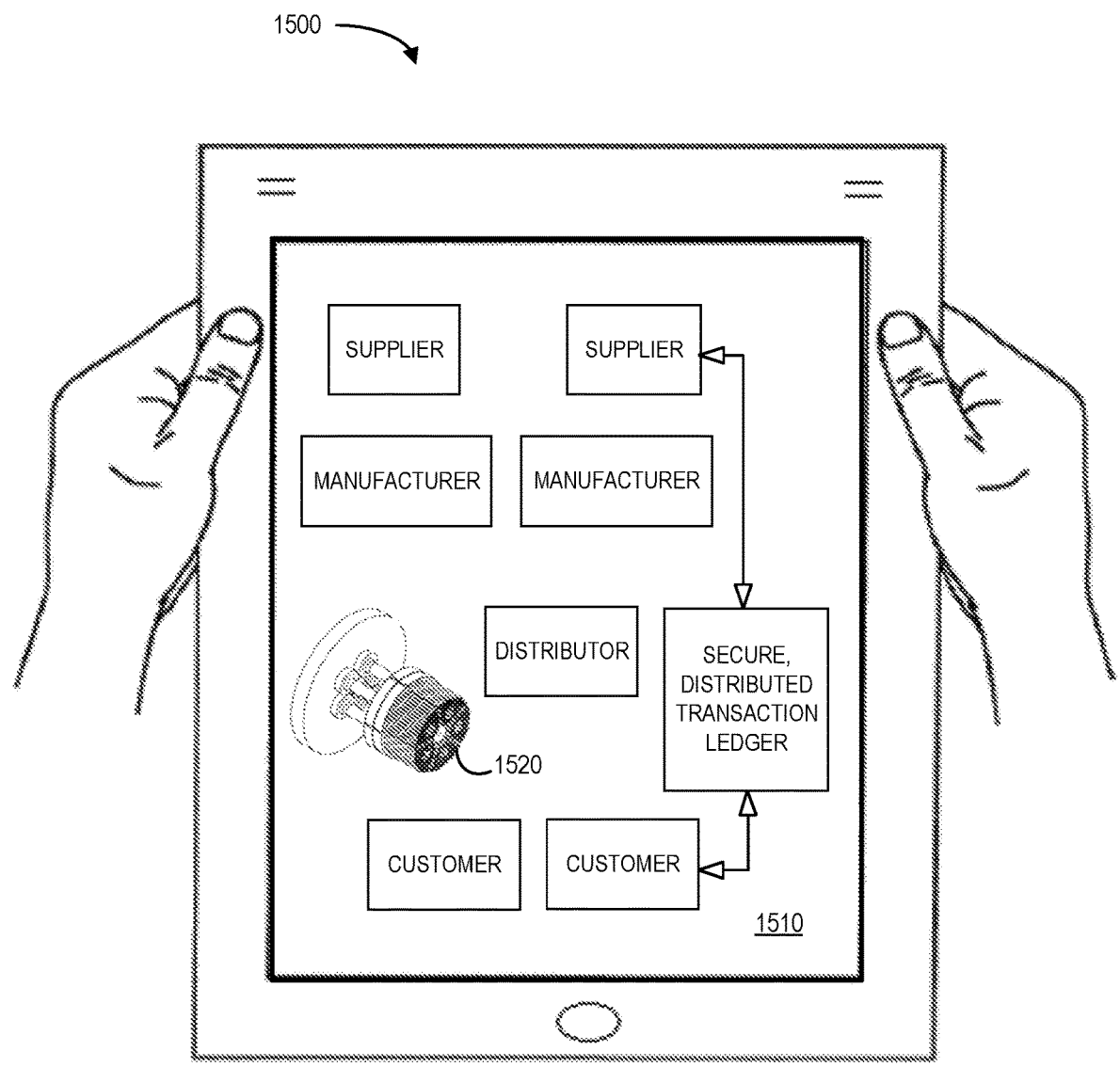
FIG. 15 illustrates a tablet computer providing a display according to some embodiments.

Although specific hardware and data configurations have been described herein, note that any number of other configurations may be provided in accordance with embodiments of the present invention (e.g., some of the information described herein may be combined or stored in external systems). Moreover, although embodiments have been described with respect to transaction information processing system, note that embodiments might be associated with other types of processing systems in general. Similarly, the displays shown and described herein are provided only as examples, and other types of displays and display devices may support any of the embodiments. For example, FIG. 15 illustrates a tablet computer 1500 with a display 1510 that might utilize an interactive graphical user interface. The display 1510 might comprise a graphical overview of the devices associated with a supply chain and/or the products that are being exchanged. Selection of an element on the display 1510 might result in further information about that element being presented 1520 (e.g., a current status of an industrial asset).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate transaction processing associated with an industrial asset supply chain having a first entity and a second entity, comprising:
a first entity database storing electronic records including information associated with pre-delivery data about an industrial asset;
a first entity communication port to exchange information via a distributed computer system;
a first entity computer processor coupled to the first entity database and the first entity communication port and adapted to:
retrieve from the first entity database the information associated with the pre-delivery data about the industrial asset, and
record pre-delivery data about the industrial asset via a secure, distributed transaction ledger;
a second entity database storing electronic records including information associated with a post-delivery event involving the industrial asset;
a second entity communication port to exchange information via the distributed computer system; and
a second entity computer processor coupled to the second entity database and the second entity communication port and adapted to:
retrieve from the second entity database the information associated with the post-delivery event involving the industrial asset,
record post-delivery event data about the industrial asset via the secure, distributed transaction ledger; and
a transaction prediction platform associated with the secure, distributed transaction ledger and adapted to trigger one or more payments for the industrial asset supply chain based on the pre-delivery data and the post-delivery event data.

2. The system of claim 1, wherein the secure, distributed transaction ledger comprises blockchain technology.

3. The system of claim 2, wherein the blockchain ledger is: (i) controlled by a single, centralized entity, or (ii) controlled by multiple, distributed entities.

4. The system of claim 1, wherein the industrial asset supply chain is associated with at least one of: (i) a local supply chain, (ii) an international supply chain, and (iii) a global supply chain.

5. The system of claim 1, wherein the first entity is associated with at least one of: (i) a component supplier, (ii) a manufacturer of the industrial asset, and (iii) a distributor.

6. The system of claim 5, wherein the second entity is associated with at least one of: (i) a delivery entity, (ii) an installer entity, (iii) a customer, and (iv) a user of the industrial asset.

7. The system of claim 1, wherein the post-delivery event is associated with an indication that at least one of: (i) the industrial asset has been delivered, (ii) the industrial asset has been installed, (iii) the industrial asset is working properly, and (iv) the industrial asset has been used.

8. The system of claim 1, wherein information recorded in the secure, distributed transaction ledger is associated with at least one of: (i) quality information, (ii) delivery information, (iii) mission critical information, (iv) physical location data, (v) product quality information, (vi) material quality information, (vii) inspection information, (viii) a price of a good, (ix) a price of a service, (x) contractual commitment data, (xi) delivery conditions, (xii) shipping information, and (xiii) a smart contract.

9. The system of claim 1, wherein the industrial asset is associated with at least one of: (i) an engine, (ii) an aircraft, (iii) a locomotive, (iv) power generation, (v) a wind turbine, (vi) a medical device, (vii) farming equipment, (viii) an autonomous vehicle, (ix) additive manufacturing, and (x) an unmanned aerial vehicle.

10. The system of claim 1, wherein the transaction prediction platform is associated with at least one of the first entity and the second entity.

11. A computer-implemented method to facilitate transaction processing associated with an industrial asset supply chain having a first entity and a second entity, comprising:
- retrieving, by a first entity computer processor from a first entity database, electronic records including information associated with pre-delivery data about an industrial asset;
- recording, by the first entity computer processor, pre-delivery data about the industrial asset via a secure, distributed transaction ledger;
- retrieving, by a second entity computer processor from a second entity database, electronic records including information associated with a post-delivery event involving the industrial asset;
- recording, by the second entity computer processor, post-delivery event data about the industrial asset via the secure, distributed transaction ledger; and
- triggering, by at least one of the first entity computer processor and the second entity computer processor, one or more payments for the industrial asset supply chain based on the pre-delivery data and the post-delivery event data.

12. The method of claim 11, wherein the secure, distributed transaction ledger comprises blockchain technology.

13. The method of claim 12, wherein the blockchain ledger is: (i) controlled by a single, centralized entity, or (ii) controlled by multiple, distributed entities.

14. The method of claim 11, wherein the supply chain is associated with at least one of: (i) a local supply chain, (ii) an international supply chain, and (iii) a global supply chain.

15. The method of claim 11, wherein the first entity is associated with at least one of: (i) a component supplier, (ii) a manufacturer of the industrial asset, and (iii) a distributor.

16. The method of claim 15, wherein the second entity is associated with at least one of: (i) a delivery entity, (ii) an installer entity, (iii) a customer, and (iv) a user of the industrial asset.

17. A non-transitory, computer-readable medium storing instructions that, when executed by a computer processor, causes the computer processor to perform a method to facilitate transaction processing associated with an industrial asset supply chain having a first entity and a second entity, the method comprising:
- retrieving, by a first entity computer processor from a first entity database, electronic records including information associated with pre-delivery data about an industrial asset;
- recording, by the first entity computer processor, pre-delivery data about the industrial asset via a secure, distributed transaction ledger;
- retrieving, by a second entity computer processor from a second entity database, electronic records including information associated with a post-delivery event involving the industrial asset;
- recording, by the second entity computer processor, post-delivery event data about the industrial asset via the secure, distributed transaction ledger; and
- triggering, by at least one of the first entity computer processor and the second entity computer processor, one or more payments for the industrial asset supply chain based on the pre-delivery data and the post-delivery event data.

18. The medium of claim 17, wherein the post-delivery event is associated with an indication that at least one of: (i) the industrial asset has been delivered, (ii) the industrial asset has been installed, (iii) the industrial asset is working properly, and (iv) the industrial asset has been used.

19. The medium of claim 17, wherein information recorded in the secure, distributed transaction ledger is associated with at least one of: (i) quality information, (ii) delivery information, (iii) mission critical information, (iv) physical location data, (v) product quality information, (vi) material quality information, (vii) inspection information, (viii) a price of a good, (ix) a price of a service, (x) contractual commitment data, (xi) delivery conditions, (xii) shipping information, and (xiii) a smart contract.

20. The medium of claim 17, wherein the industrial asset is associated with at least one of: (i) an engine, (ii) an aircraft, (iii) a locomotive, (iv) power generation, (v) a wind turbine, (vi) a medical device, (vii) farming equipment, (viii) an autonomous vehicle, (ix) additive manufacturing, and (x) an unmanned aerial vehicle.

* * * * *